United States Patent [19]

Itoh

[11] Patent Number: 4,962,509
[45] Date of Patent: Oct. 9, 1990

[54] CODE VIOLATION DETECTION CIRCUIT FOR USE IN AMI SIGNAL TRANSMISSION

[75] Inventor: Kuniharu Itoh, Tokyo, Japan

[73] Assignee: NEC Corporation, Tokyo, Japan

[21] Appl. No.: 359,307

[22] Filed: May 31, 1989

[30] Foreign Application Priority Data

May 31, 1988 [JP] Japan ............................. 63-132950

[51] Int. Cl.$^5$ .......................................... H04L 25/34
[52] U.S. Cl. ..................................... 375/17; 371/57.1
[58] Field of Search ................... 375/17, 94; 371/57.1

[56] References Cited

U.S. PATENT DOCUMENTS 4,658,399 4/1987 D'Angio et al. .................. 371/57.1

Primary Examiner—Douglas W. Olms
Assistant Examiner—Marianne Huseman
Attorney, Agent, or Firm—Sughrue, Mion, Zinn, Macpeak & Seas

[57] ABSTRACT

A circuit for detecting a code violation in an alternate mark inversion signal comprises a first detecting circuit receiving the alternate mark inversion signal for gener- ating a first detection signal at continuous occurrence of two first polarity signals without an intervening signal of a second polarity, the first and second polarity signals being indicative of the same binary logical level, and a second detecting circuit receiving the alternate mark inversion signal for generating a second detection signal at continuous occurrence of two second polarity signals without interleaving the first polarity signal. The first detection signal is inputted to a first enable signal gener- ating circuit for generating a first enable signal having a predetermined active period, and the second detection signal is inputted to a second enable signal generating circuit for generating a second enable signal having a predetermined active period. A first violation detection circuit receives the second detection signal and the first enable signal and generates a first code violation detec- tion signal when the second detection signal is gener- ated during the active period of the first enable signal. A second violation detection circuit receives the first de- tection signal and the second enable signal and gener- ates a second code violation detection signal when the first detection signal is generated during the active per- iod of the second enable signal.

6 Claims, 5 Drawing Sheets

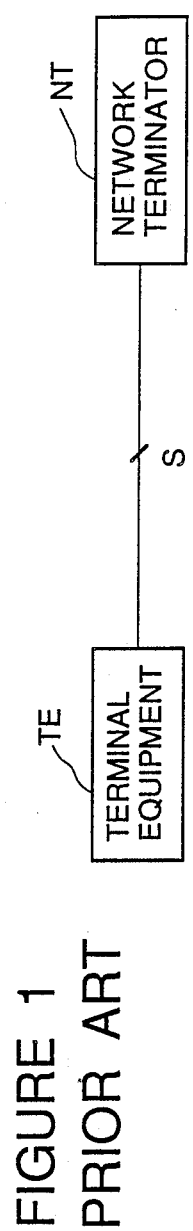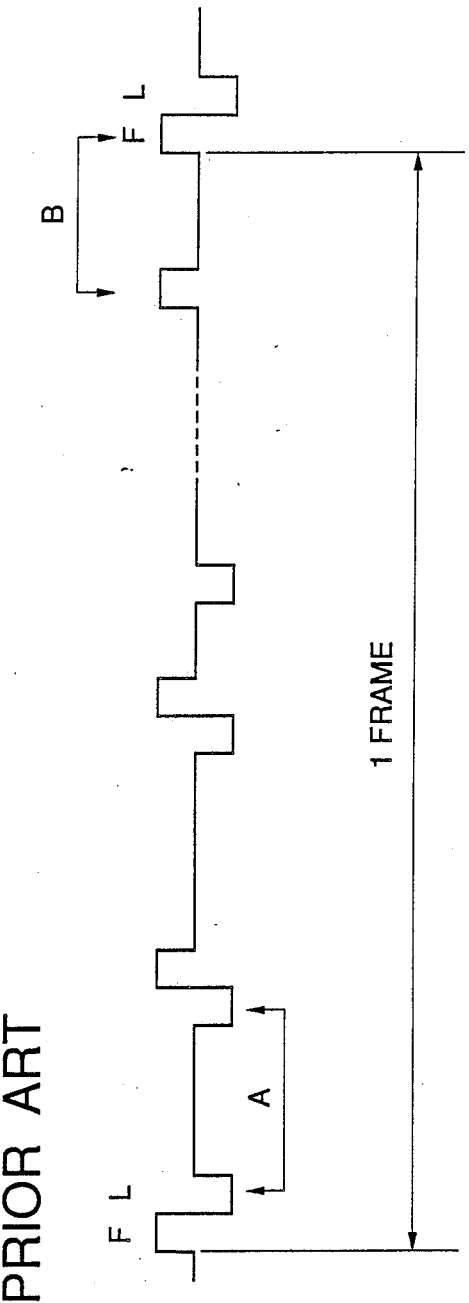
FIGURE 1
PRIOR ART
FIGURE 3
PRIOR ART

CODE VIOLATION DETECTION CIRCUIT FOR USE IN AMI SIGNAL TRANSMISSION

BACKGROUND OF THE INVENTION

1. Field of the Invention

The present invention relates to a code violation detecting circuit, and more specifically to a circuit for detecting a code violation in the transmission of a signal transmission system in accordance with the CCITT-I430, regardless of a connection polarity of the transmission line.

2. Description of Related Art

Recently, the demand for digital data communication is increasing year after year. Under this circumstance, the CCITT (International Telegraph and Telephone Consultative Committee) advances an international standard for ISDN (Integrated Services Digital Network). One typical standard is a so called "alternate mark inversion" (AMI) signal.

In this AMI signal, a first binary logic level of for example "0" is alternately expressed by a first polarity signal and a second polarity signal different from each other in polarity, and a second binary logic level "1" complementary to the first binary logic level "0" is expressed by a signal different in potential level from each of the first and second polarity signals. The code violation is realized by continuous occurrence of two same polarity signals within a predetermined period starting from a start of each frame without interleaving the other polarity signal.

In the prior art, a detection of the code violation has been performed by detecting the continuous occurrence of two same polarity signals within the predetermined period without interleaving the other polarity signal, since the S point is not necessarily connected in a proper condition. However, the continuous occurrence of two same polarity signals without an intervening signal of the other polarity will appear, not only at the code violation portion in each signal frame, but also at a boundary between each pair of continuous frames, for example given by a framing bit and a data bit which is included in the just preceding frame and which has the the same polarity as that of the framing bit. As a result, only the correct code violation cannot be detected in the prior art violation detection circuit.

SUMMARY OF THE INVENTION

Accordingly, it is an object of the present invention to provide a code violation circuit which has overcome the above mentioned defect of the conventional one.

Another object of the present invention is to provide a code violation circuit for the AMI signal which can detect only a correct code violation in each frame.

The above and other objects of the present invention are achieved in accordance with the present invention by a circuit for detecting a code violation in an alternate mark inversion signal in which a first binary logic level is alternately expressed by a first polarity signal and a second polarity signal different from each other in polarity, and a second binary logic level complementary to the first binary logic level is expressed by a signal different in potential level from each of the first and second polarity signals, the code violation being realized by continuous occurrence of two same polarity signals without an intervening signal of the other polarity, comprising a first detecting circuit receiving the alternate mark inversion signal for generating a first detection signal at continuous occurrence of two first polarity signals without an intervening signal of the second polarity; a second detecting circuit receiving the alternate mark inversion signal for generating a second detection signal at continuous occurrence of two second polarity signals an intervening signal of the first polarity; a first enable signal generating circuit receiving the first detection signal for generating a first enable signal having a predetermined active period; a second enable signal generating circuit receiving the second detection signal for generating a second enable signal having a predetermined active period; a first violation detection circuit receiving the second detection signal and the first enable signal for generating a first code violation detection signal when the second detection signal is generated during the active period of the first enable signal; and a second violation detection circuit receiving the first detection signal and the second enable signal for generating a second code violation detection signal when the first detection signal is generated during the active period of the second enable signal.

With the above mentioned arrangement, the connection polarity of the transmission line is automatically detected on the basis of the input data, and thereafter, the code violation is detected with reference to the detected connection polarity.

The above and other objects, features and advantages of the present invention will be apparent from the following description of preferred embodiments of the invention with reference to the accompanying drawings.

BRIEF DESCRIPTION OF THE DRAWINGS

FIG. 1 is a block diagram illustrating a CCITT standard model of an interface for the ISDN;

FIG. 3 is a waveform diagram illustrating the code violation in the ISDN format;

DESCRIPTION OF THE PREFERRED EMBODIMENT

Referring to FIG. 1, there is shown a block diagram illustrating a CCITT standard model of an interface for the ISDN.

In FIG. 1, a terminal equipment TE is a boundary between a line system and an office channel system, and is connected to a network terminator NT. A transmission line between the terminal equipment TE and the network terminator NT is called a S point, which is constituted of a bus composed of four lines according to the ISDN, so that two lines can be assigned for each of transmission and reception.

Figure 2:
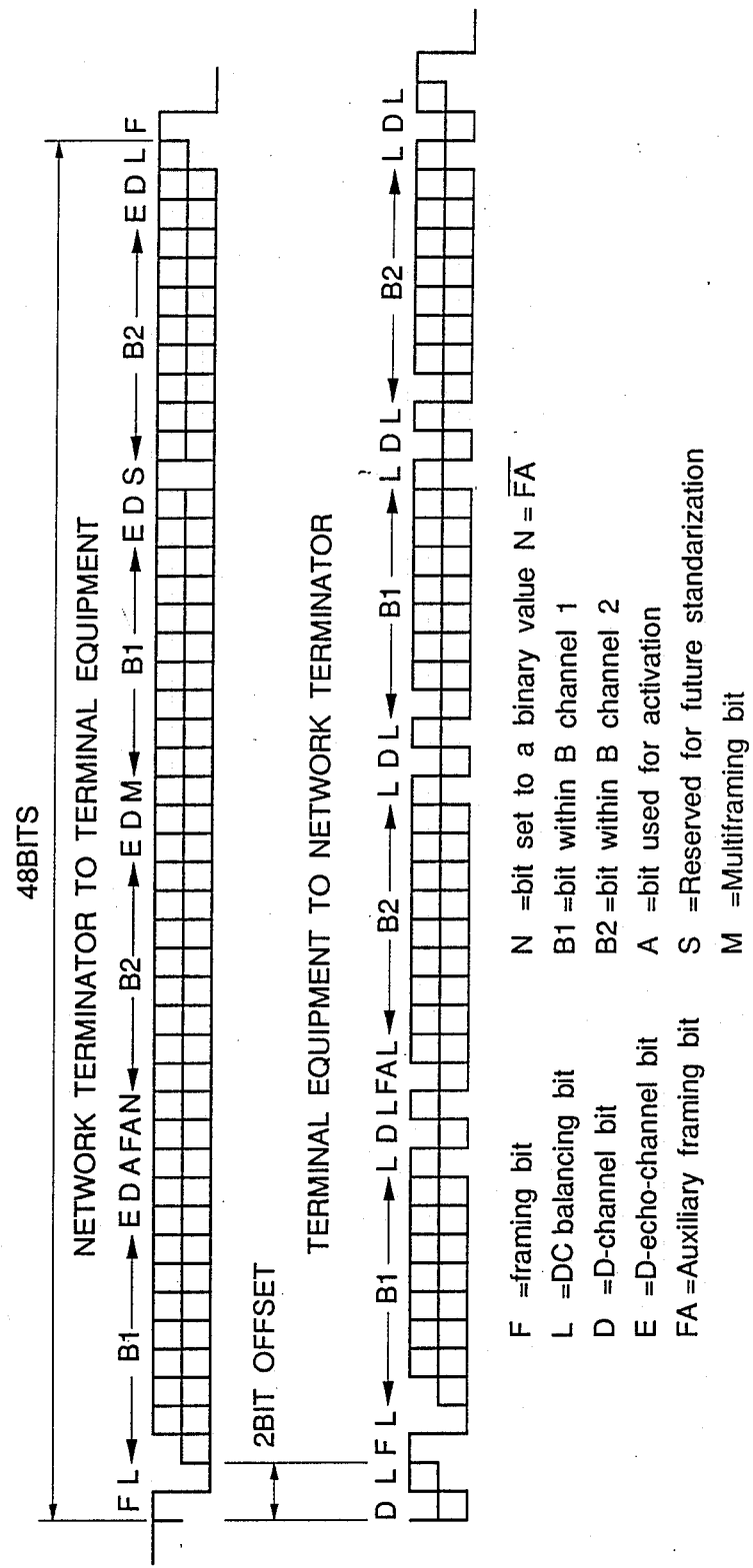
FIG. 2 is a diagram illustrating a frame structure and a channel structure on the S point shown in FIG. 1.

Turning to FIG. 2, there is shown a diagram illustrating a frame structure and a channel structure of data transferred on the S point shown in FIG. 1. The format of the shown signal is 100%-AMI signal, and a binary value "1" is represented by "no-signal", and a binary value "0" is indicated by a positive or negative pulse. For the following explanation, the binary value "0" indicated by the positive pulse is denoted by "+0" and the binary value "0" indicated by the negative pulse is denoted by "−0".

In a basic AMI signal, "+0" and "−0" alternately appear. But, in the ISDN format, a code violation is introduced for a frame synchronism. FIG. 3 illustrates the code violation in the ISDN format.

In FIG. 3, a first bit of each frame is a framing bit F, which is followed by a balancing bit L constituted of "−0". A binary value "0" firstly appearing after the balancing bit L is forcedly made to "−0", so that two binary values "0" having the same polarity will successively appear. This continuous occurrence of the two binary values having the same polarity constitutes the code violation. In the ISDN format, ordinarily, the code violation is set to appear within 14 bits from the framing bit F, so that the detection of the code violation will give the frame synchronism.

In the meantime, if the S point is correctly connected, the code violation can be detected as the continuous occurrence of the two "−0"s. However, the CCITT recommendation requires that even if the S point is inversely connected, the code violation can be properly detected. Therefore, it is necessary to detect the continuous occurrence of the two "+0"s.

Figure 4:
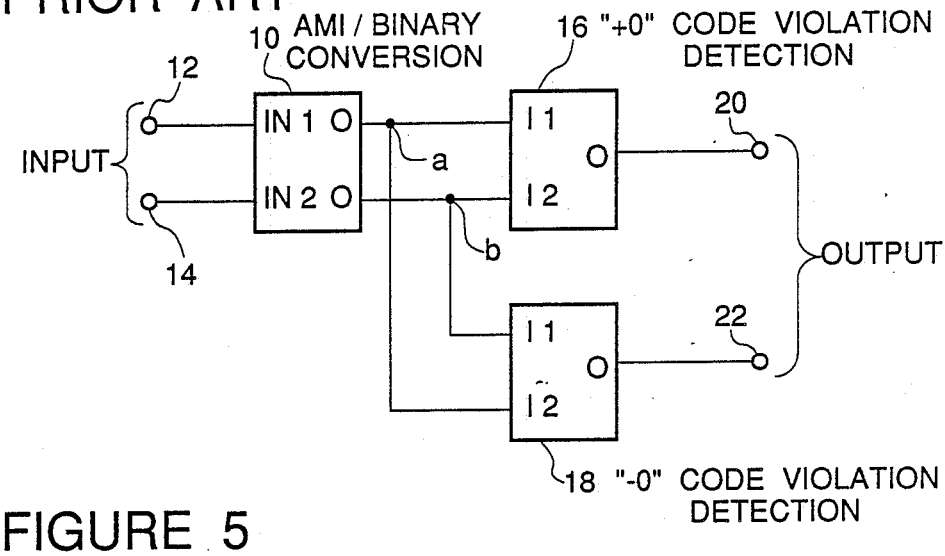
FIG. 4 is a block diagram of a conventional code violation detecting circuit.

Referring to FIG. 4, there is shown a block diagram of a conventional code violation detecting circuit.

The shown circuit includes an AMI/binary conversion circuit 10 having a pair of inputs IN1 and IN2 connected to a pair of input terminals 12 and 14, which are connected to a pair of lines of a receiving bus of the S point. The conversion circuit 10 generates a first binary signal corresponding to "+0", and a second binary signal corresponding to "−0". These binary signals are inputted to a "+0" code violation detection circuit 16 and a "−0" code violation detection circuit 18. The "+0" code violation detection circuit 16 detects the continuous occurrence of two "+0"s, and generates a detection signal to an output terminal 20. On the other hand, the "−0" code violation detection circuit 18 detects the continuous occurrence of two "−0"s, and generates a detection signal to an output terminal 22.

Figure 5:
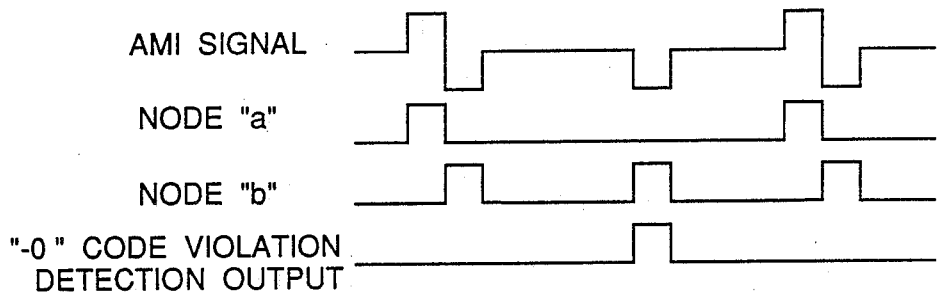
FIG. 5 is a waveform diagram illustrating an operation for detecting the code violation in the case that the S point is correctly connected.
Figure 6:
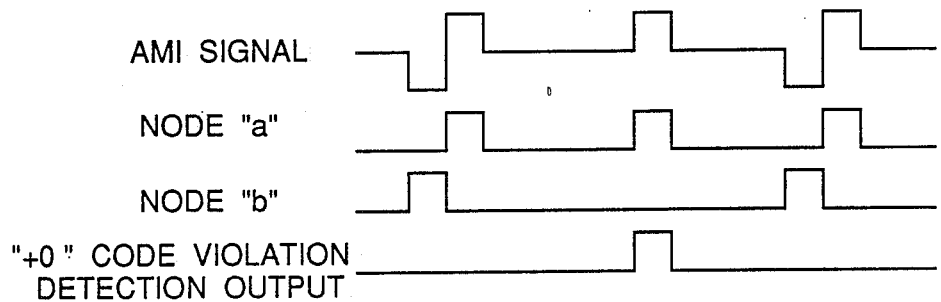
FIG. 6 is a waveform diagram illustrating an operation for detecting the code violation in the case that the S point is inversely connected.

FIG. 5 illustrates an operation for detecting the code violation in the case that the S point is correctly connected, and FIG. 6 illustrates an operation for detecting the code violation in the case that the S point is inversely connected. Now, the operation of the circuit shown in FIG. 4 will be explained with reference to FIGS. 5 and 6.

Namely, as seen from FIGS. 5 and 6, the AMI/binary conversion circuit 10 outputs a signal of "1" (a positive pulse) to a node "a" when "+0" of the AMI signal is detected, and a signal of "1" to a node "b" when "−0" of the AMI signal is detected. On the other hand, when "1" of the AMI signal is detected, the AMI/binary conversion circuit 10 outputs a signal of "0" (a base level) to both of the nodes "a" and "b".

The "+0" code violation detection circuit 16 outputs a detection signal of "1" to an output terminal 20 when it detects the continuous occurrence of two "1"s on the node "a" within a period of 14 bits without interleaving the "1" on the node "b", as shown in FIG. 6. On the other hand, the "−0" code violation detection circuit 18 outputs a detection signal of "1" to an output terminal 22 when it detects the continuous occurrence of two "1"s on the node "b" within a period of 14 bits without interleaving the "1" on the node "a", as shown in FIG. 5.

As a result, if the S point is correctly connected, the code violation is detected by the "−0" code violation detection circuit 18, as seen from FIG. 5. However, if the S point is inversely connected, the code violation is detected by the "+0" code violation detection circuit 18, as seen from FIG. 6.

Actually, the continuous occurrence of the two "0"s having the same polarity in the AMI signal will appear in a period other than the code violation period as shown by Reference Character "A" in FIG. 3. For example, in the case shown in FIG. 3, a framing bit F and a last "0" data bit in the just preceding frame have the same polarity (See a period "B"). The framing bit F and the last "0" data bit in the just preceding frame are opposite in polarity to that of the code violation in the period "A". However, it will be detected by the "+0" code violation detection circuit 18, these bits appear within a period of 14 bits. In an actual data transmission, this would have a sufficient possibility.

Accordingly, the circuit shown in FIG. 4 capable of detecting the continuous occurrence of "0" having the same polarity within the 14-bit period, is not sufficient in properly detecting only the code violation for the frame synchronism.

In this connection, it may be considered to determine the connection polarity of the S point on the basis of probability by comparing the numbers of appearance of the detection signals on the detection outputs 20 and 22. This would require a very large size of circuit, and in addition, cannot perfectly assure the correct detection.

Figure 7:
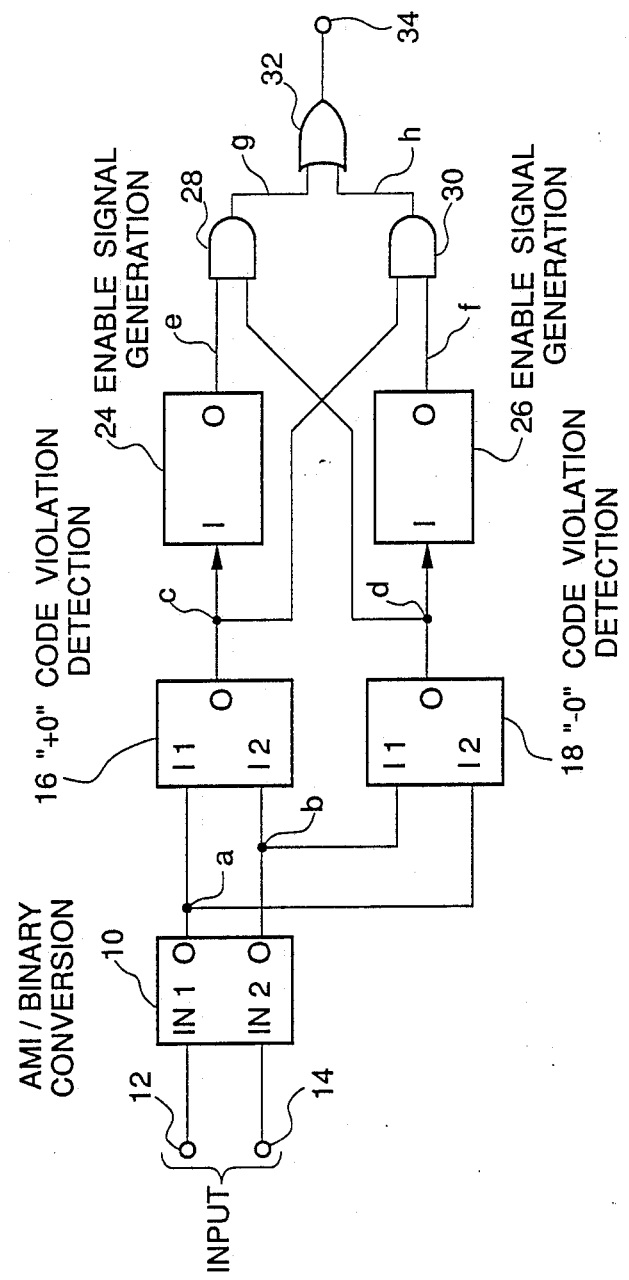
FIG. 7 is a block diagram of an embodiment of the code violation detecting circuit in accordance with the present invention.

Referring to FIG. 7, there is shown a block diagram of an embodiment of the code violation detecting circuit in accordance with the present invention. In FIG. 7, circuit elements similar to those shown in FIG. 4 are given the same Reference Numerals.

The shown circuit includes an AMI/binary conversion circuit 10 having a pair of inputs IN1 and IN2 connected to a pair of input terminals 12 and 14, to which are connected a pair of lines of a receiving bus of the S point. The conversion circuit 10 generates a first binary signal corresponding to "+0" onto a node "a", and a second binary signal corresponding to "−0" onto a node "b". These binary signals are inputted to a pair of inputs I1 and I2 of a "+0" code violation detection circuit 16 and a pair of inputs I1 and I2 of a "−0" code violation detection circuit 18.

The "+0" code violation detection circuit 16 dectects the continuous occurrence of two "1"s on the node "a" within a period of 14 bits without interleaving the "1" on the node "b", and generates a first detection signal of "1" when the continuous occurrence of two "1"s on the node "a" is detected. On the other hand, the "−0" code violation detection circuit 18 detects the continuous occurrence of two "1"s on the node "b" within a period of 14 bits without interleaving the "1" on the node "a", and generates a second detection signal of "1" when the continuous occurrence of two "−0"s on the node "b" is detected.

The first detection signal is inputted from the "+0" code violation detection circuit 16 through a node "c" to a first enable signal generating circuit 24, which generates a first enable signal having an active period corresponding to a 14-bit period. The second detection signal is inputted from the "−0" code violation detection circuit 18 through a node "d" to a second enable signal generating circuit 26, which generates a second enable signal having an active period corresponding to a 14-bit period.

The first enable signal is supplied from the first enable signal generating circuit 24 through a node "e" to a first input of an AND gate 28, which in turn has a second input connected to receive the second detection signal from the "−0" code violation detection circuit 18. The AND gate 28 generates a first code violation detection signal when the second detection signal is generated during the active period of the first enable signal. On the other hand, the second enable signal is supplied from the second enable signal generating circuit 26 through a node "f" to a first input of another AND gate 30, which in turn has a second input connected to receive the first detection signal from the "+0" code violation detection circuit 16. The second AND gate 30 generates a second code violation detection signal when the first detection signal is generated during the active period of the second enable signal. Outputs of these AND gates 28 and 30 are connected through nodes "g" and "h", respectively, to an OR gate 32, which generates a resultant code violation detection signal to an output terminal 34.

Now, operation of the above mentioned circuit will be explained with reference to FIG. 8 which illustrates an operation for detecting the code violation in the circuit shown in FIG. 7.

Figure 8:
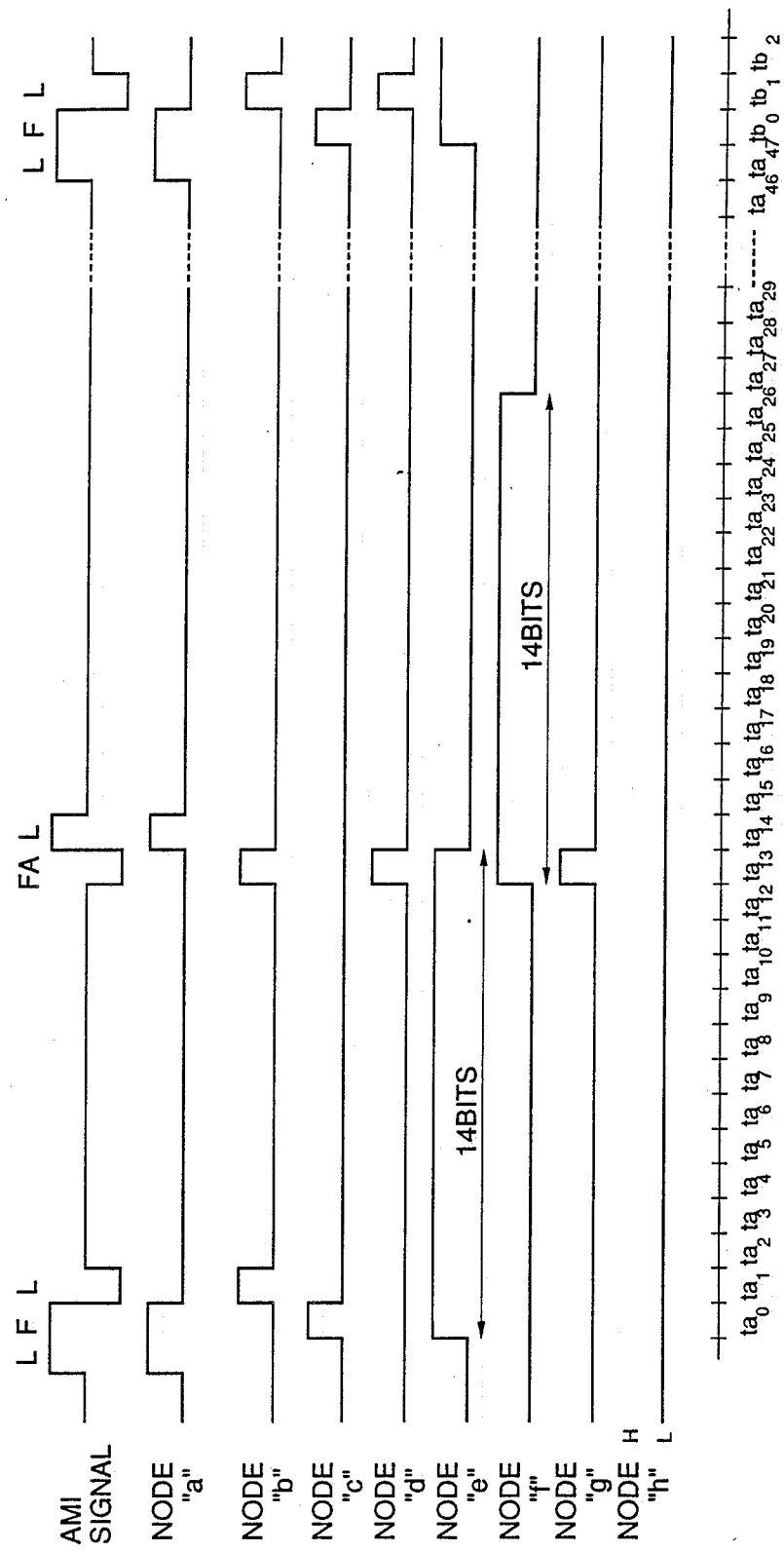
FIG. 8 is a timing chart illustrating an operation for detecting the code violation in the circuit shown in FIG. 7.

In the AMI signal exemplified in FIG. 8, a framing bit F positioned at a head of each frame and a balancing bit L located at a tail end of each frame are formed of "+0". Therefore, at a timing $ta_0$, the continuous occurrence of the two "+0"s is detected and the first detection signal (indicative of the continuous occurrence of two "+0"s) is outputted to the node "c". In response to this first detection signal, the first enable signal generating circuit 24 outputs the first enable signal of "1" having the 14-bit width to the node "e".

On the other hand, the correct code violation is formed of the balancing bit L appearing just after the framing bit F, and an auxiliary framing bit FA which appears at a timing $ta_{13}$ after the framing bit F. These bits are detected by the "−0" code violation detecting circuit 18, and the second detection signal (indicative of the contiuous occurrence of two "−0"s) is outputted to the node "d". In response to this second detection signal, the second enable signal generating circuit 26 outputs the second enable signal of "1" having the 14-bit width to the node "f".

Accordingly, at the timing $ta_{13}$, the node "e" and the node "d" become a high level ("1"), and therefore, the AND gate 28 outputs a signal of "1". As a result, the resultant code violation detection signal is outputted to the output terminal 34.

However, a detection signal indicative of the continuous occurrence of two same polarity "0"s composed of the framing bit F ( of "+0" in the shown example) and a data or control bit of the same polarity included in the just preceding frame and appearing before the framing bit F will not overlap with the enable signal outputted on the node "f", since the detection signal is generated at the timing $tb_0$ in the case that the framing bit F constitutes a second bit of the two continuously occurring bits of the same polarity. Therefore, the output of the AND gate 30 is maintained at the level of "0".

The above mentioned operation is directed to the code violation detection in the case that the S point is correctly connected. However, if the S point is inversely connected, the AND gate 30 will output the signal of "1" when the code violation is detected, so that the resultant code violation detection signal of "1" is outputted from the terminal 34.

Accordingly, the circuit explained above and shown in FIG. 7 will be able to detect only the correct code violation, regardless whether the S point is connected correctly or inversely.

As seen from the above, the code violation detection circuit in accordance with the present invention, can discriminate the polarity of the S point connection and detect only the correct code violation, without requiring a large size of circuit.

The invention has thus been shown and described with reference to the specific embodiments. However, it should be noted that the present invention is in no way limited to the details of the illustrated structures but changes and modifications may be made within the scope of the appended claims.

I claim;

1. A circuit for detecting a code violation in an alternate mark inversion signal in which a first binary logic level is alternately expressed by a first polarity signal and a second polarity signal different from each other in polarity, and a second binary logic level complementary to the first binary logic level is expressed by a signal different in potential level from each of the first and second polarity signals, the code violation being realized by continuous occurrence of two same polarity signals without an intervening signal of the other polarity, comprising:

a first detecting circuit receiving the alternate mark inversion signal for generating a first detection signal at continuous occurrence of two first polarity signals without an intervening signal of the other polarity;

a second detecting circuit receiving the alternate mark inversion signal for generating a second detection signal at continuous occurrence of two second polarity signals without an intervening signal of the other polarity;

a first enable signal generating circuit receiving the first detection signal for generating a first enable signal having a predetermined active period;

a second enable signal generating circuit receiving the second detection signal for generating a second enable signal having a predetermined active period;

a first violation detection circuit receiving the second detection signal and the first enable signal for generating a first code violation detection signal when the second detection signal is generated during the active period of the first enable signal; and a second violation detection circuit receiving the first detection signal and the second enable signal for generating a second code violation detection signal when the first detection signal is generated during the active period of the second enable signal.

2. A circuit claimed in claim 1 further including a conversion circuit receiving the alternate mark inversion signal for generating a first binary signal corresponding to the first polarity signal and a second binary signal corresponding to the second polarity signal, these first and second binary signals being inputted to the first and second detecting circuits.

3. A circuit claimed in claim 2 further including an output logic gate receiving the first and second code violation detection signals for generating a resultant code violation detection signal.

4. A circuit claimed in claim 3 wherein the first detecting circuit generates the first detection signal of a high logical level at the continuous occurrence of the two first polarity signals without an intervening signal of the other polarity and the second detecting circuit generates the second detection signal of a high logical level at the continuous occurrence of the two second polarity signals without an intervening signal of the other polarity, wherein the first enable signal generating circuit generates the first enable signal of a high logical level having the predetermined active period and the second enable signal generating circuit generates the second enable signal of a high logical level having a predetermined active period, and wherein the first violation detection circuit includes a first AND circuit receiving the second detection signal and the first enable signal so as to output the first code violation detection signal of a high logical level when the second detection signal of the high logical level is generated during the high logical level period of the first enable signal, and the second violation detection circuit includes a second AND circuit receiving the first detection signal and the second enable signal so as to output the second code violation detection signal of a high logical level when the first detection signal of the high logical level is generated during the high logical level period of the second enable signal.

5. A circuit claimed in claim 4 wherein the output logic gate includes an OR circuit receiving the first and second code violation detection signals for generating the resultant code violation detection signal when at least one of the first and second code violation detection signals is at a high logical level.

6. A circuit claimed in claim 1 wherein the first binary logic level is of "0" and the second binary logic level is of "1".

* * * * *

UNITED STATES PATENT AND TRADEMARK OFFICE
CERTIFICATE OF CORRECTION

PATENT NO. : 4,962,509

DATED : October 9, 1990

INVENTOR(S) : Kuniharu Itoh

It is certified that error appears in the above-identified patent and that said Letters Patent is hereby corrected as shown below:

Col. 2, line 6, after "signals" insert -- without --.

Signed and Sealed this

Twenty-eighth Day of July, 1992

Attest:

DOUGLAS B. COMER

Attesting Officer     Acting Commissioner of Patents and Trademarks